US010564989B2

(12) United States Patent
Babbitt et al.

(10) Patent No.: US 10,564,989 B2
(45) Date of Patent: Feb. 18, 2020

(54) THREAD INDEPENDENT PARAMETRIC POSITIONING FOR RENDERING ELEMENTS

(71) Applicant: Microsoft Technology Licensing, LLC, Redmond, WA (US)

(72) Inventors: Kevin M. Babbitt, Seattle, WA (US); Rossen Atanassov, Bellevue, WA (US); Ian J. Prest, Bellevue, WA (US); Bogdan Brinza, Seattle, WA (US); Samuel R. Fortiner, Bothell, WA (US); Richard K. James, Redmond, WA (US)

(73) Assignee: Microsoft Technology Licensing, Redmond, WA (US)

( * ) Notice: Subject to any disclaimer, the term of this patent is extended or adjusted under 35 U.S.C. 154(b) by 62 days.

(21) Appl. No.: 15/824,548

(22) Filed: Nov. 28, 2017

(65) Prior Publication Data

US 2019/0163498 A1 May 30, 2019

(51) Int. Cl.
*G06F 9/451* (2018.01)
*G06F 3/14* (2006.01)
*G06F 3/0488* (2013.01)
*G06F 3/0484* (2013.01)
*G06F 3/0482* (2013.01)

(52) U.S. Cl.
CPC .............. *G06F 9/451* (2018.02); *G06F 3/14* (2013.01); *G06F 3/0482* (2013.01); *G06F 3/0488* (2013.01); *G06F 3/04847* (2013.01)

(58) Field of Classification Search
None
See application file for complete search history.

(56) References Cited

U.S. PATENT DOCUMENTS

| 5,978,838 | A | * | 11/1999 | Mohamed | ........... G06F 9/30036 709/208 |
| 6,115,051 | A | * | 9/2000 | Simons | ................... G06T 13/00 345/442 |
| 6,920,635 | B1 | | 7/2005 | Lodrige et al. | |
| 6,950,927 | B1 | | 9/2005 | Apisdorf et al. | |
| 8,081,184 | B1 | | 12/2011 | Nordquist | |
| 8,108,625 | B1 | | 1/2012 | Coon et al. | |

(Continued)

OTHER PUBLICATIONS

"Non Final Office Action Issued in U.S. Appl. No. 15/838,040", dated Feb. 27, 2019, 22 Pages.
(Continued)

*Primary Examiner* — Jason A Pringle-Parker
(74) *Attorney, Agent, or Firm* — Fountainhead Law Group P.C.

(57) ABSTRACT

A first thread receives a start movement command and a parametric curve from a second thread in response to the second thread receiving an input to move an element that is rendered in an interface. The parametric curve defines parameters for movement of an element. The first thread calculates a positioning of the element on the interface using the parametric curve. Then, the first thread positions the element in the interface based on the positioning and continues to calculate the positioning and position the element in the interface using the parametric curve until a stop movement command is received from the second thread.

20 Claims, 10 Drawing Sheets

(56) References Cited

U.S. PATENT DOCUMENTS

| | | |
|---|---|---|
| 8,164,596 B1 * | 4/2012 | Bech .................. G06T 13/00 |
| | | 345/473 |
| 2006/0150194 A1 | 7/2006 | Xing et al. |
| 2006/0244754 A1 | 11/2006 | Beda et al. |
| 2008/0117220 A1 | 5/2008 | Gorchetchnikov et al. |
| 2009/0267950 A1 * | 10/2009 | Finn .................. G06T 13/40 |
| | | 345/474 |
| 2011/0285747 A1 | 11/2011 | Kilgard |
| 2014/0282423 A1 | 9/2014 | Gottschlich et al. |
| 2016/0170813 A1 | 6/2016 | Robison |
| 2016/0357703 A1 | 12/2016 | Suzuki |
| 2019/0180405 A1 | 6/2019 | Prest et al. |

OTHER PUBLICATIONS

Atanassov, et al., "CSS Positioned Layout Module Level 3", Retrieved from: <<https://drafts.csswg.org/css-position-3/#position-property>>, Retrieved Date: Nov. 8, 2017, 83 Pages.

* cited by examiner

THREAD INDEPENDENT PARAMETRIC POSITIONING FOR RENDERING ELEMENTS

BACKGROUND

A user interface displays elements that can be moved in the user interface. For example, a user may scroll an element in different directions in the user interface. To process the movement, a computing device may include a user interface thread and a rendering thread. The user interface thread may receive the input and then direct the rendering thread to move the element linearly in a direction. The rendering thread can then move the element in the user interface.

Some types of elements may require the rendering thread to query the user interface thread to determine whether actions should be performed during the movement of the element. For example, a sticky header causes an element to "stick" or stop movement at a sticky position on the user interface even though the input is still moving. A sticky header may stop moving at the sticky position for a certain amount of time while the movement from the input is still ongoing, such as from a flick movement that moves the element with inertia in a direction. To determine whether the element should be stopped while the input is still moving, the rendering thread may continuously send queries to the user interface thread asking whether or not the element should be in the sticky position. When the element reaches the sticky position, the user interface thread responds to the rendering thread with a message directing the rendering thread to stop movement of the element. The process to determine when to stop movement of the element causes a lot of querying back and forth between the rendering thread and the user interface thread. Further, because of the time it takes the rendering thread to query the user interface thread and then receive a response from the user interface thread, the rendering of the element may be behind the time of the user interface thread. This may result in an inaccurate rendering of the element, which may cause a choppy display of the movement of the element. For example, the element may go past the sticky position because the rendering thread has not yet received a response from the user input thread. Then, when the rendering thread receives the response directing it to stop movement of the element at the sticky position, the rendering thread has to move the element back to the sticky position, which results in a choppy display of the element. Further, the rendering thread may be late in unsticking the element when it is time to move the element from the sticky position because the rendering thread has to similarly query the user interface thread to determine when to unstick the element and start movement of the element again.

DETAILED DESCRIPTION

A computing device includes a user interface thread and a rendering thread. The user interface thread processes input for a user interface that is displaying elements. The rendering thread renders the elements on the user interface. When the user interface thread receives an input, such as an input to move an element that is rendered in the interface, the user interface thread calculates a parametric curve that defines parameters for moving the element. For example, the parametric curve may define the positioning of the element on the user interface over time.

The rendering thread then renders the element using the parametric curve. For example, the rendering thread moves the element based on a position calculated from the parametric curve. In some examples, the parametric curve may define parameters that cause the element to stop movement at a first time and remain stationary for a time period while the input is still ongoing. Then, the parametric curve defines parameters that cause the element to start movement at a second time. This functionality of the parametric curve may provide a sticky positioning functionality for the element. Because the parametric curve is used, the rendering thread does not have to query the user interface thread to determine whether or not the sticky positioning function for the element should be used. Rather, the parametric curve defines when the sticky positioning function should be used for the element.

Although a sticky positioning function is described, it will be understood that the parametric curve may define other types of movement for elements in the user interface, such as different functions and movement directions. The parametric curve allows the rendering thread to perform the movement of the element without having to query the user interface thread to determine when to alter a linear movement of the element. Not having to query the user interface thread provides a quicker rendering on the user interface for the element in addition to providing a more accurate rendering of the movement. For example, the rendering thread may stop the movement of the element when the element reaches the sticky position on the user interface using the parametric curve in contrast to the overshoot that occurred as described in the Background.

Computing System Overview

Figure 1:
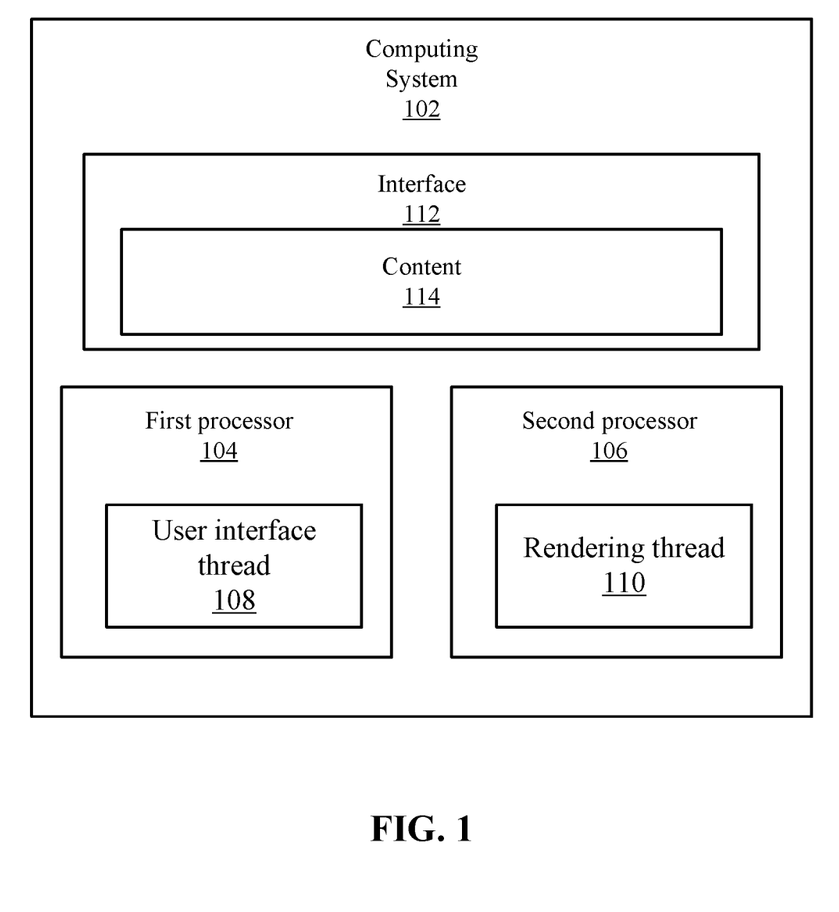
FIG. 1 depicts a simplified example of a computing system according to some embodiments.

FIG. 1 depicts a simplified example of a computing system 102 according to some embodiments. Computing system 102 includes a user interface 112 that displays content 114. For example, user interface 112 may include a browser, such as a web browser, that is displaying a page, such as a webpage. However, content 114 may be different types of output, such as audio, video, text, audio, etc.

Content 114 may include elements that may be moved in user interface 112. For example, menus, headers, text, or other information may be moved up and down, left or right, or in any other directions. Additionally, as will be discussed in more detail, the elements may include a behavior associated with a sticky positioning function in which the positioning of the element may stick to a sticky position based on a context, such as the menu approaching the top of a container. Although a sticky positioning function is described, it will be understood that other movements may be appreciated.

Computing system 102 also includes a first processor 104 that is executing a user interface thread 108 and a second processor 106 that is executing a rendering thread 110. A thread may be a sequence of instructions that are executed by a computer processor. Although first processor 104 and second processor 106 are described, it will be understood that user interface thread 108 and rendering thread 110 may be running on the same processor. However, in some embodiments, first processor 104 may be a computer processing unit (CPU) and second processor 106 may be a graphical processing unit (GPU). User interface thread 108 and rendering thread 110 operate independently and can communicate with one another.

To render elements in content 114, rendering thread 110 receives information from user interface thread 108 regarding input received on user interface 112. For example, user interface 112 receives input from a user to move the elements on user interface 112. User interface thread 108 can then calculate a parametric curve based on the user input. The parameters of the parametric curve define the movement of the element over time. For example, the input may be an ongoing movement, such as when a user flicks the user interface in a direction to provide a movement that is ongoing. The ongoing movement may be provided with a single input that provides a movement with inertia that does not stop until the user stops the movement or the movement slows down to stop after a certain amount of time. User interface thread 108 may use characteristics of the input and generate a parametric curve that defines how the element should move based on the input. Some characteristics may be the velocity of the input that user interface thread 108 uses to define how fast to move the element and other characteristics may be the direction of the movement. As will be discussed below in more detail, the parameters of the parametric curve may also define when to enable a sticky positioning function for the element, which stops the movement of the element when the element reaches a sticky position for a time period.

User interface thread 108 then sends the parametric curve with a start movement command to rendering thread 110. Once receiving the start movement command, rendering thread 110 starts the movement of the element. As time progresses, rendering thread 110 then continues to move the element based on the parametric curve. For example, rendering thread 110 calculates a position of the element as time moves based on the positioning defined by the parametric curve. Rendering thread 110 continues to position (e.g., move or pause movement) the element in user interface 112 based on the parametric curve until a stop movement command is received. For example, the user may start the ongoing movement with a flick upward and then at some point may stop the movement, such as by stopping the upward flick movement or the flick movement eventually ends on its own. When the stop movement command is received, rendering thread 110 then stops the movement and awaits further input.

In between receiving the start movement command and the stop movement command, rendering thread 110 may move the element in user interface 112 based on the parametric curve and does not need to communicate with user interface thread 108 to perform any functionality associated with the movement. For example, rendering thread 110 can enforce the sticky positioning functionality using the parametric curve without having to query user interface thread 108. Rather, rendering thread 110 calculates the positioning of the element and values of the parametric curve can define when to perform the sticky positioning function.

Sticky Positioning Example

Figure 2A:
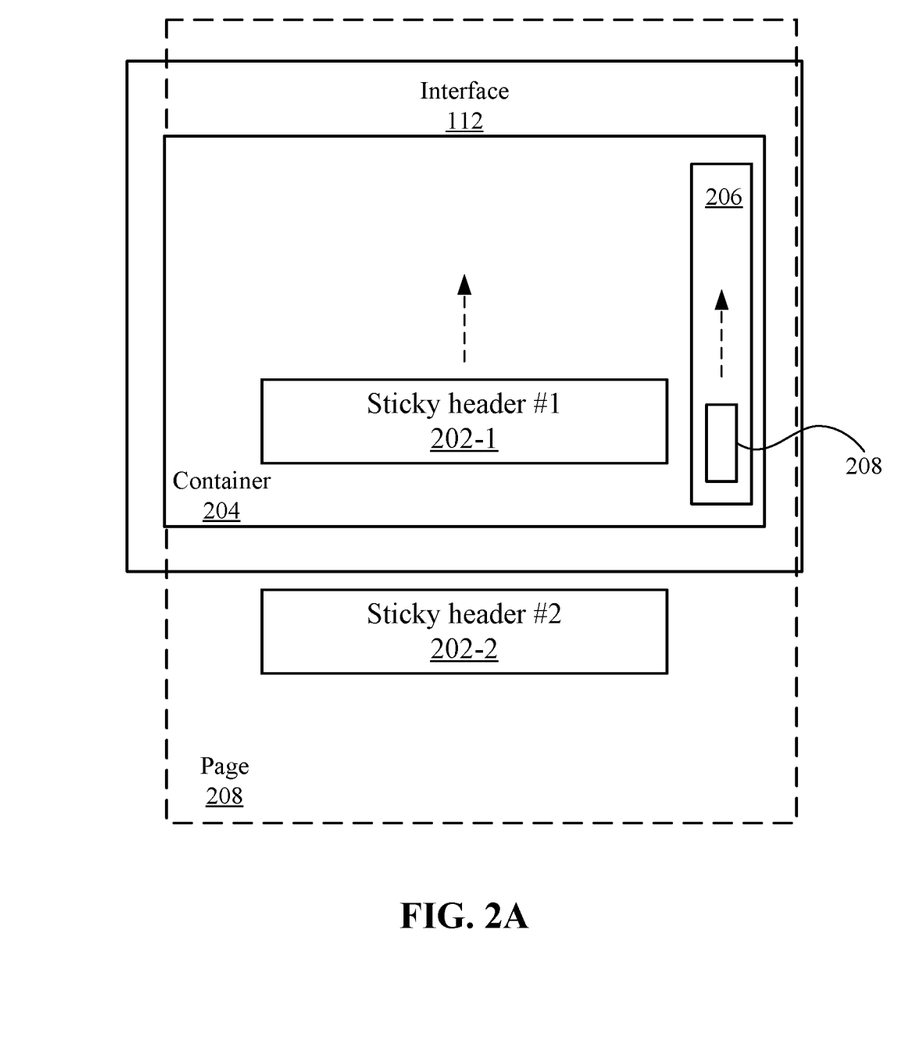
FIG. 2A shows an example of an interface before performing a sticky positioning function according to some embodiments.

FIGS. 2A-2D show an example of the sticky positioning functionality according to some embodiments. FIG. 2A shows an example of interface 112 before performing a sticky positioning function according to some embodiments. Interface 112 includes a container 204 that may be part of a page 208. For example, container 204 may be a section of page 208 that may include elements, such as sticky headers 202. Page 208 may be bigger than interface 112 or container 204, and when elements are moved, page 208 may move and the elements may move out of bounds from a view port that displays the elements and the elements are not displayed on interface 112. Sticky headers 202 may scroll within container 204.

For discussion purposes, a sticky header #1 at 202-1 and a sticky header #2 at 202-2 are shown, but other sticky headers and elements may be displayed in container 204. For example, content may be included between sticky header #1 and sticky header #2. In some examples, the sticky headers may display the first alphabetical letter of a list, such as A, B, C, and the content below each sticky header may start with that respective alphabetical letter. For example, under the sticky header "A", the names Alan, Alice, etc. may be found; and render the sticky header "B", the names Bob, Brice, etc. may be found.

Container 204 may allow the scrolling of sticky headers 202 or other movements using any type of input means. For example, a user may use a user input area 206 to scroll sticky headers #1 and #2 in a direction, such as up or down. Although input area 206 is described, it will be understood that other input areas may be used. For example, a user may provide input anywhere on interface 112 to move sticky headers #1 and #2. In one type of operation, the user input may move sticky headers in the upward direction. For example, a slider bar 208 may be moved to move sticky headers 202 upward. In some examples, the user may perform a "flick" or other motion that provides an ongoing movement upwards or downwards at a velocity determined based on the user input.

Figure 2B:
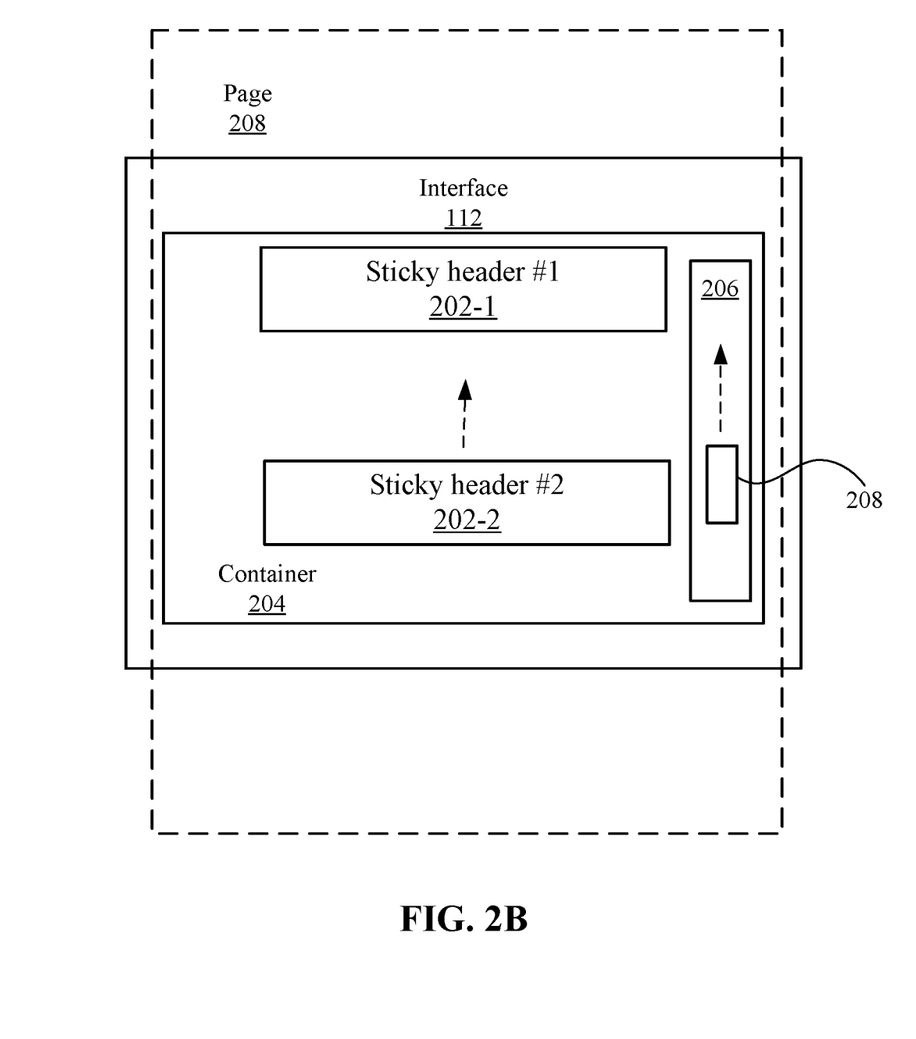
FIG. 2B shows an example of the interface when performing a sticky positioning function according to some embodiments.

FIG. 2B shows an example of interface 112 when performing a sticky positioning function according to some embodiments. When sticky header #1 reaches a sticky position, sticky header #1 may stick to that position or stop movement even though the input is still ongoing. For example, the initial movement from user input may still be moving in the upward direction. In some examples, slider bar 210 may still be moving upward based on the initial user input. However, sticky header #1 may stick to the position at the top of container 204 and not move. For example, the list of names under sticky header #1 may continue to scroll upward, such as all the names beginning with the letter "A" may continually move upward and disappear while sticky header #1 202-1 stays in the same position. Also, sticky header #2 continues to scroll upward while sticky header #1 remains in its sticky position.

Figure 2C:
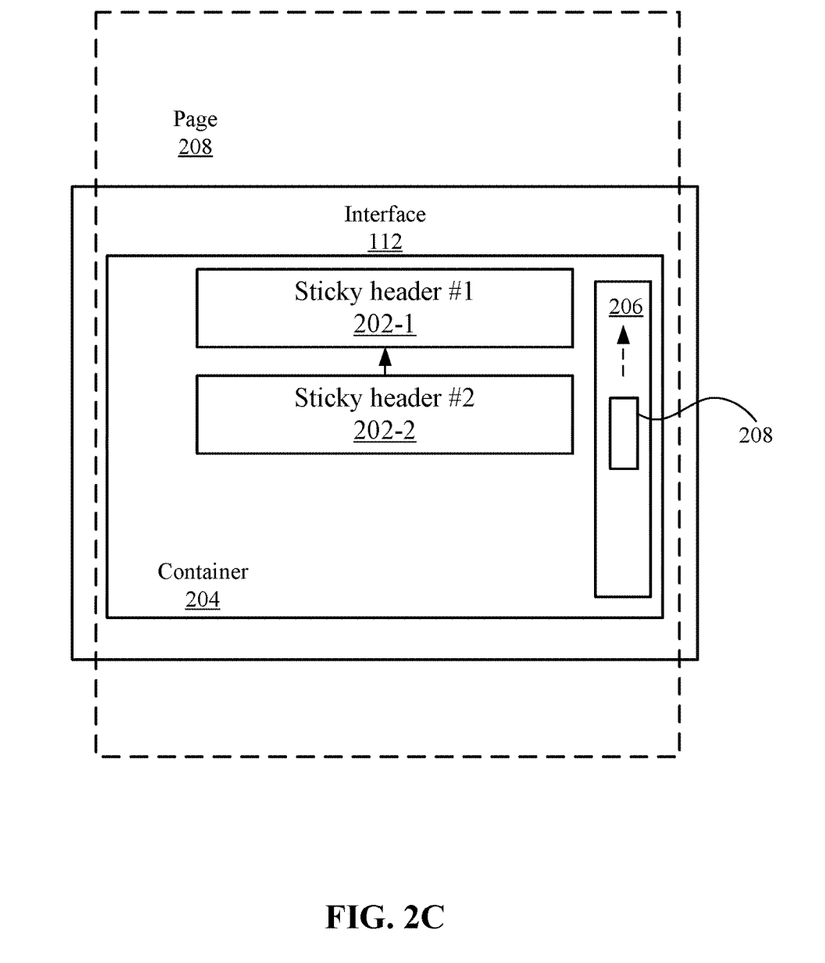
FIG. 2C shows an example where sticky header #2 has almost reached the sticky position where sticky header #1 is shown according to some embodiments.
Figure 2D:
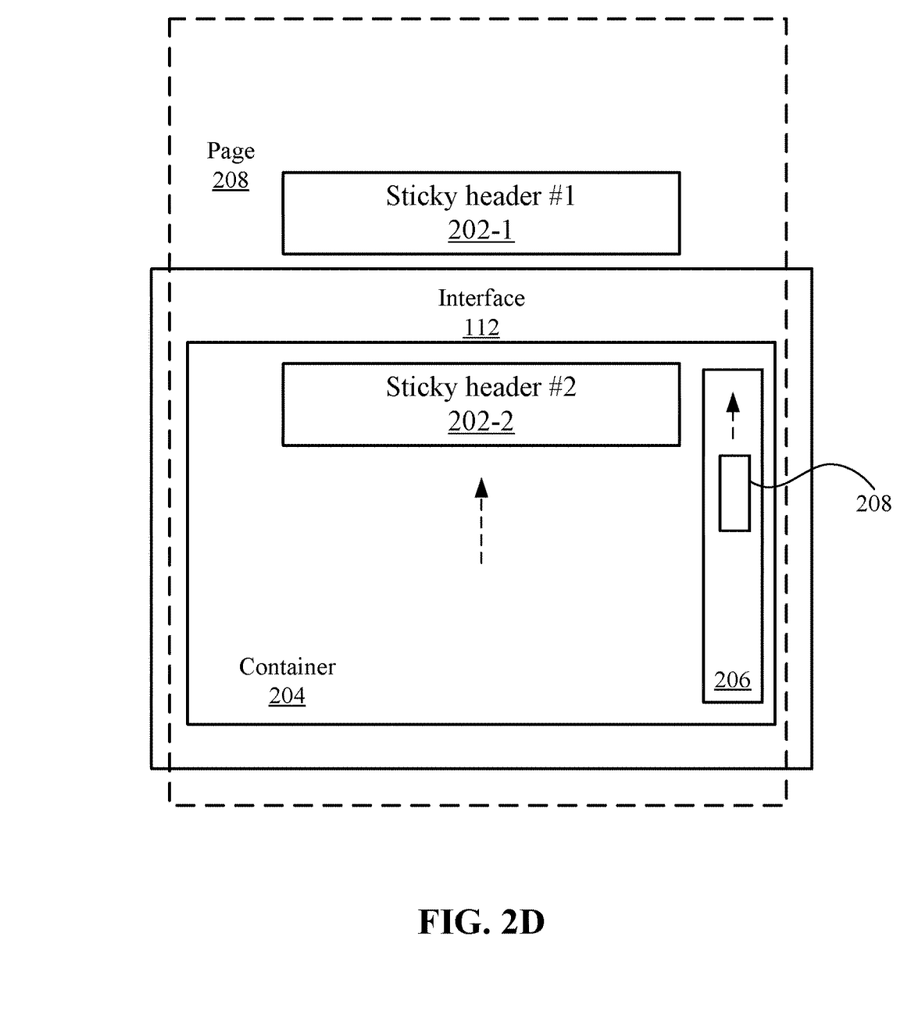
FIG. 2D shows an example of the change in positioning for sticky header #1 when the header is released from the sticky position according to some embodiments.

One reason for the use of the sticky positioning function in this case is to display the letter "A" while all the names beginning with A are scrolled up. However, when the names with the letter A end and sticky header #2 continues to scroll up, sticky header #2 will eventually reach the sticky position. FIG. 2C shows an example where sticky header #2 has almost reached the sticky position where sticky header #1 is shown according to some embodiments. When this occurs, rendering thread 110 unsticks sticky header #1 from the sticky position and starts movement of sticky header #1 again. FIG. 2D shows an example of the change in positioning for sticky header #1 when the header is released from the sticky position according to some embodiments. In this example, the movement of the input has continued upward, and sticky header #1 has now been moved from its sticky positioning, such as sticky header #1 is now off-screen of user interface 112 and not displayed. However, sticky header #2 has reached the sticky position and rendering thread 110 has stopped movement of sticky header #2 even though the movement is still ongoing. Sticky header #2 may similarly stay in the sticky position until rendering thread 110 determines that sticky header #2 should be released from the sticky position. This may occur when another sticky header is scrolled upward to replace sticky header #2.

Rendering thread 110 performs the above sticky positioning function using the parametric curve until a stop movement command is received. This allows rendering thread 110 to independently control the sticky positioning function without having to communicate with user interface thread 108. This process will now be described in more detail.

Thread Independent Control Using a Parametric Curve

Figure 3:
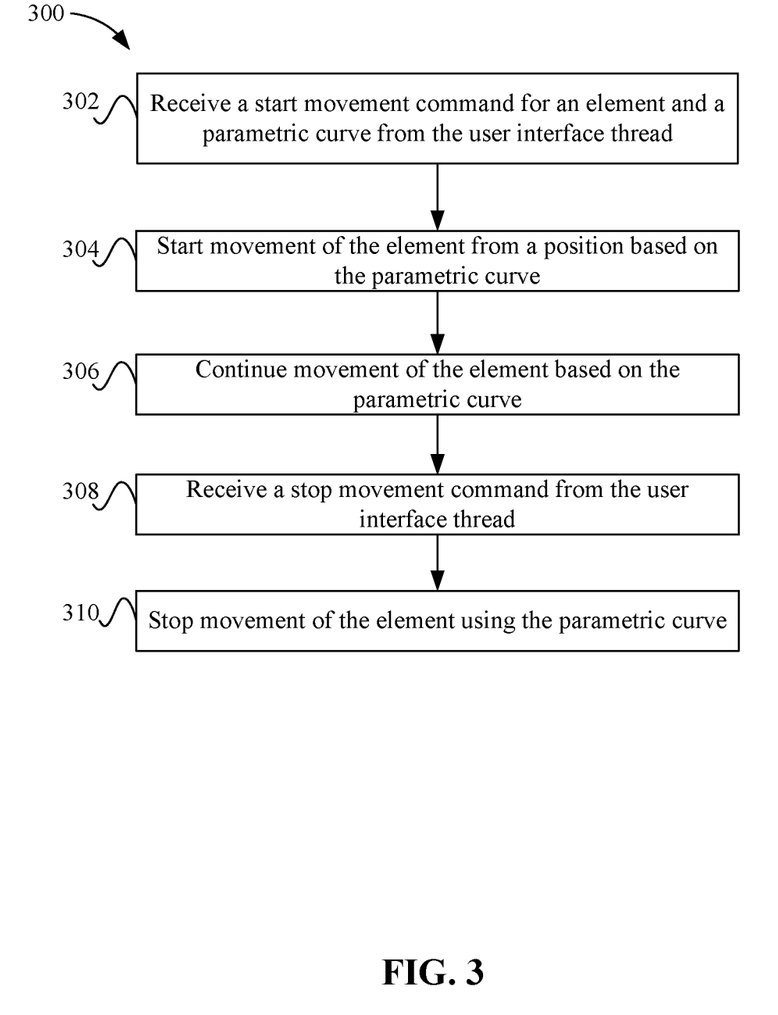
FIG. 3 depicts a simplified flowchart of a method for controlling movement of an element using a parametric curve according to some embodiments.

FIG. 3 depicts a simplified flowchart 300 of a method for controlling movement of an element using a parametric curve according to some embodiments. At 302, rendering thread 110 receives a start movement command for an element and a parametric curve from user interface thread 108. User interface thread 108 may send the start movement command and the parametric curve in response to receiving an input for user interface 112. For example, a user may provide an input to start movement of an element (or elements), such as movement of all elements in the container. Different types of input may be received, such as the user may provide an ongoing movement. User interface thread 108 may analyze characteristics of the user input and calculate a parametric curve. For example, the parametric curve may define the positioning of an element over time. In some embodiments, user interface thread 108 may take the initial position of the element and determine the movement of element over time based on the input. For example, the input may be linear in a direction. The parametric curve may start and stop movement based on the predicted position of the element over time.

Figure 4:
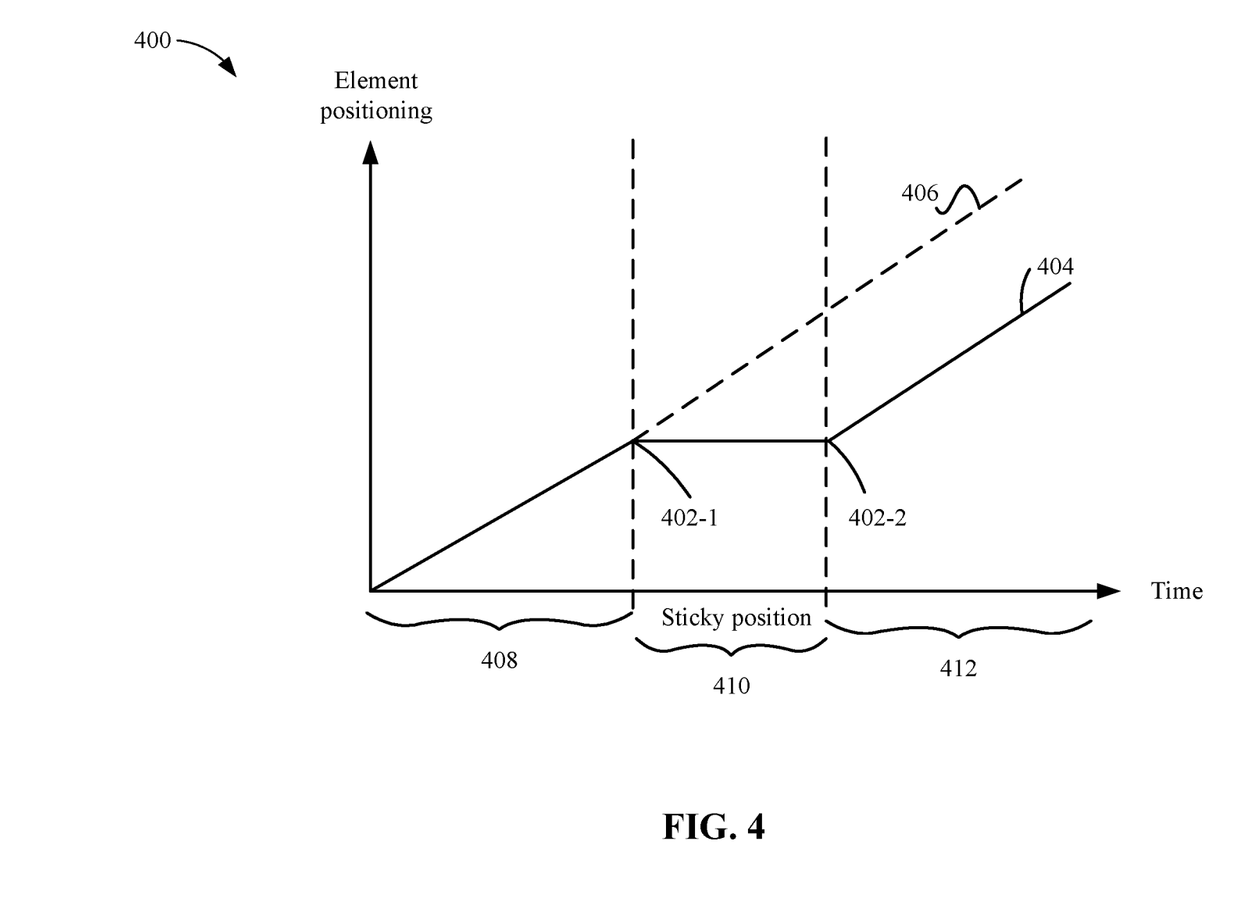
FIG. 4 depicts a graph that shows a parametric curve according to some embodiments.

FIG. 4 depicts a graph 400 that shows a parametric curve according to some embodiments. The Y axis of graph 400 is the positioning of an element in user interface 112 and the X axis is time. A parametric curve 404 is shown in a solid line. Over time, the parametric curve defines the element's position in user interface 112. For example, during a first time period 408, the parametric curve defines the element's positioning as moving linearly in a direction, such as upward. Then, at a first parameter defined by a point 402-2, which may be a position in the user interface 112, the movement stops. In this case, during a second time period 410, the sticky positioning function is enforced where the element is not moved in user interface 112. At a second parameter defined by a point 402-2, the parametric curve starts movement of the element again during a third time period 412. In the third time period, the movement is linear in a direction, such as the upward direction.

The parametric curve defines the positioning of the element via parameters that define points 402-1 and 402-2. The parameters may be determined based on a predicted movement of the element that depends on the velocity of the user input and the current position of the element. In some embodiments, the parameters may be a time that interface thread 108 calculates to enforce the sticky positioning function. If a parametric curve was not used, then the movement may proceed in a linear fashion as shown by the dotted lines defined by 406 and rendering thread 110 would have to query user interface thread 108 to determine whether to enable the sticky positioning function as described in the Background.

Referring back to FIG. 3, at 304, rendering thread 110 starts movement of the element from a position. For example, the movement is in an upward direction, rendering thread 110 starts moving the element in a direction at a rate defined by the parametric curve. In some examples, different slopes of the parametric curve may define how fast the element moves in interface 112.

At 306, rendering thread 110 continues movement of the element based on the parametric curve. For example, as described in FIG. 4, as time progresses, rendering thread 110 moves the element based on the values of parametric curve 404, which may define different movements. For example, as described in FIG. 4, at certain times, rendering thread 110 may stop movement of the element while the movement is ongoing. In some embodiments, the movement is stopped at a sticky position as the movement continues in the upward direction. This is different from a stop movement command in which the input stops the movement of the element. Rather, the movement from the input is continuing to move in the upward direction, but the parametric curve stops the movement of the element at the sticky position.

At some point, user interface 112 may receive an input to stop the movement of the element or the input may end due to time elapsing. For example, at 308, rendering thread 110 receives a stop movement command from the user interface thread 108. User interface thread 108 may determine the stop movement command based on receiving user input in user interface 112. For example, a user may stop the movement in user interface 112, such as by stopping the scrolling or by scrolling in a different direction.

When the user input is received that stops the movement of the element or an input uses a different movement (e.g., a downward movement) from the ongoing movement, user interface thread 108 generates a stop movement command and sends that command to rendering thread 110. Then, at 310, rendering thread 110 stops movement of the element using the parametric curve. For example, the parametric curve is no longer valid after receiving the stop movement command. Rendering thread 110 then waits for other commands from user interface thread 108. For example, rendering thread 110 may receive another start movement command and another parametric curve to move the element.

Sticky Positioning Function

Figure 5:
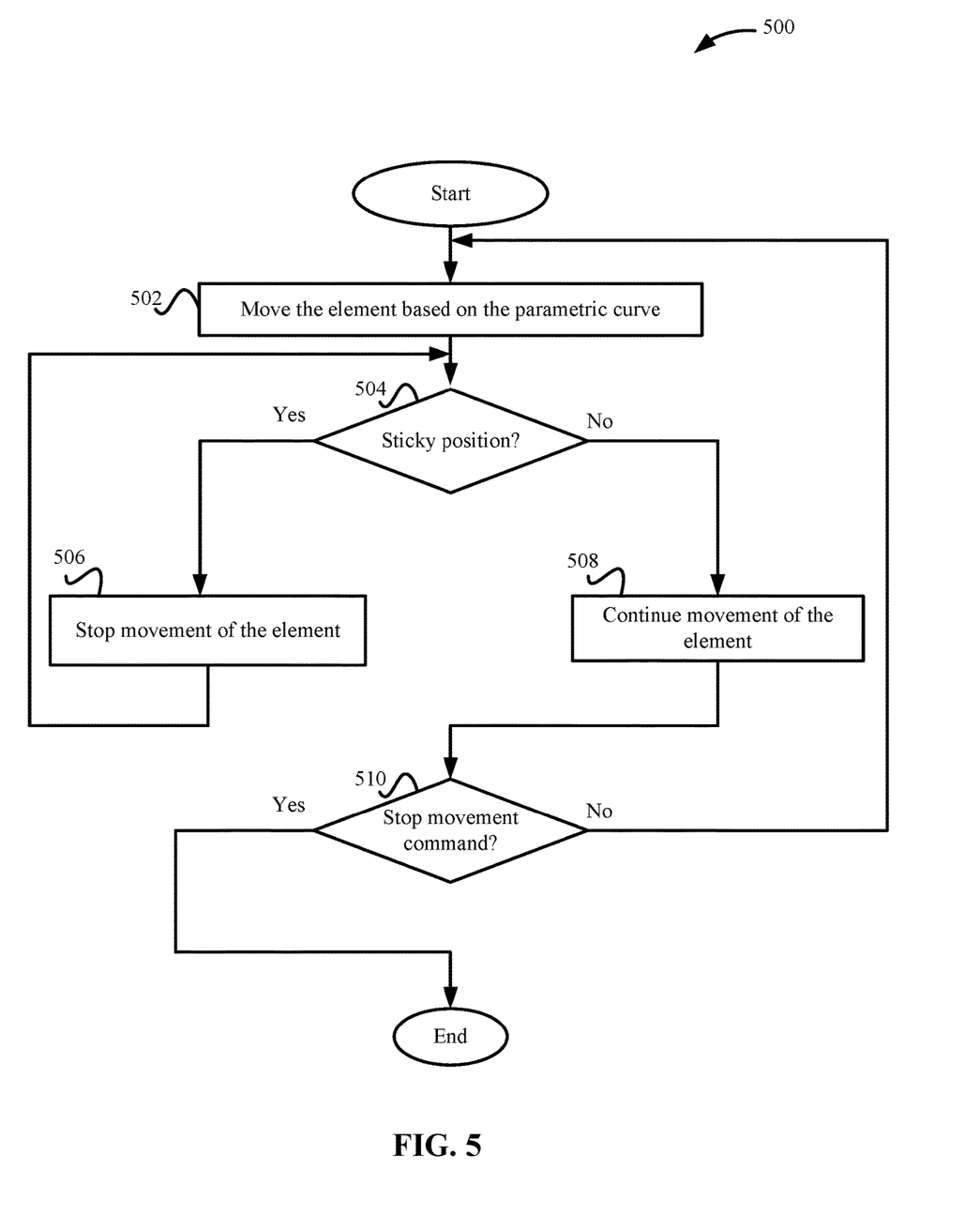
FIG. 5 depicts a simplified flowchart for performing the sticky positioning function according to some embodiments.

FIG. 5 depicts a simplified flowchart 500 for performing the sticky positioning function according to some embodiments. Upon receiving the start movement command and the parametric curve, at 502, rendering thread 110 moves the element based on the parametric curve. At 504, rendering thread 110 determines if a sticky position is reached. For example, rendering thread 110 may continue to move the element until a position in the parametric curve stops the movement. As time increases, the parametric curve may stop the movement of the element. At 506, when the sticky position is encountered, rendering thread 110 stops the movement of the element. As discussed above, the user input may still be ongoing. Then, the process reiterates to 504 where rendering thread 110 continues to follow the parametric curve and determine whether or not the sticky position should still be enabled. When the sticky positioning function is not enabled, then at 508, rendering thread 110 continues movement of the element. The movement may continue from two different states. For example, when in the sticky position, rendering thread 110 may start to move the element again from the stopped state. While not in the sticky position, rendering thread 110 continues the movement of the element according to the parametric curve.

At 510, rendering thread 110 determines when a stop movement command is received. When the stop movement command is not received, then the process reiterates to continue to move the element based on the parametric curve. When the stop movement command is received, then the process ends.

Interface Thread and Rendering Thread Interaction

Figure 6:
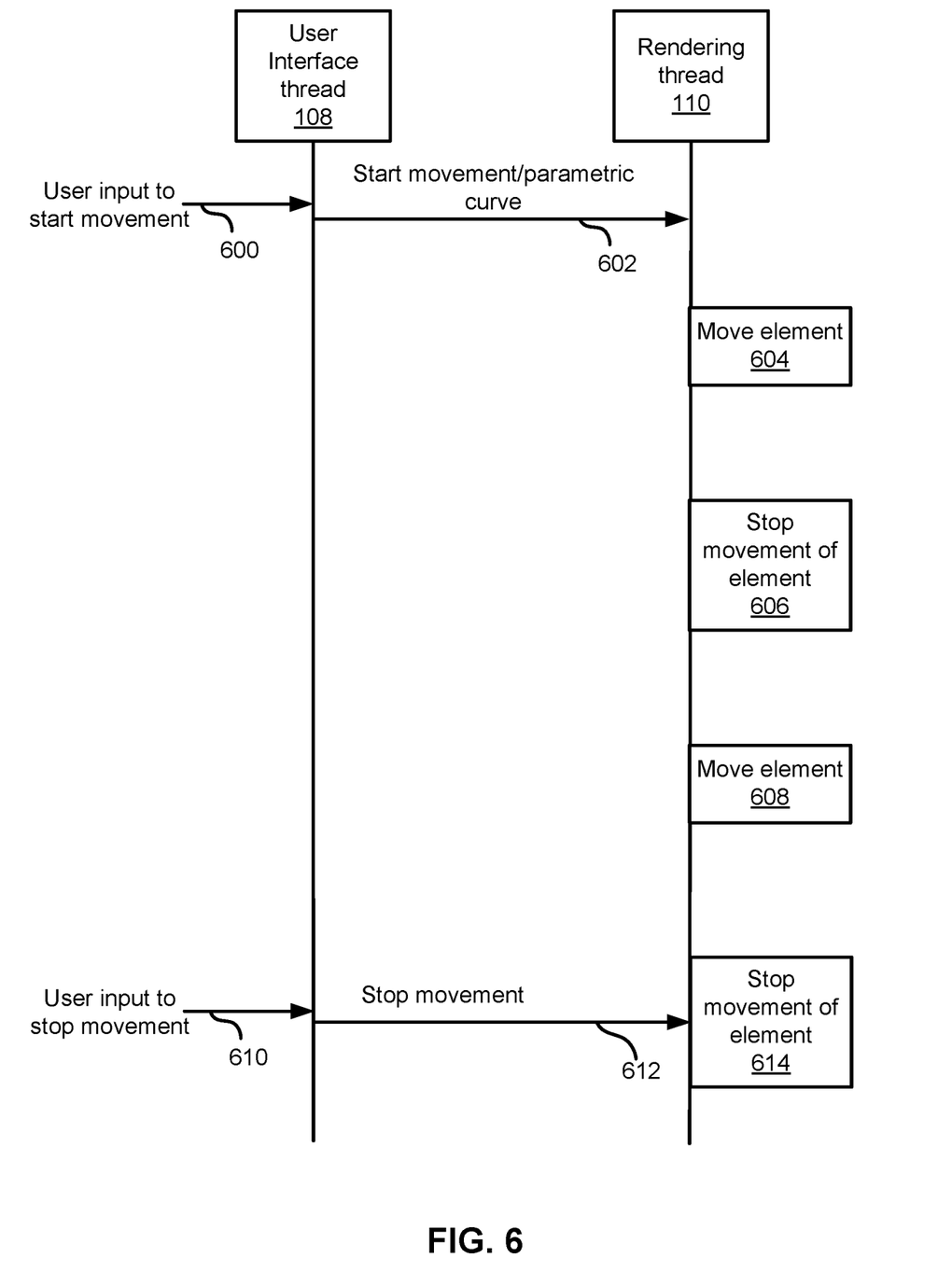
FIG. 6 depicts an example of messaging between a user interface thread and a rendering thread according to some embodiments.

FIG. 6 depicts an example of messaging between user interface thread 108 and rendering thread 110 according to some embodiments. At 600, a user input to start movement of an element is received at user interface thread 108. User interface thread 108 can then calculate the parametric curve based on the user input. For example, the velocity of the user input and a current position of the element may be used to calculate the parametric curve. Then, at 602, user interface thread 108 sends a start movement command with the parametric curve to rendering thread 110. At 604, rendering thread 110 moves the element. Then, at 606, when the parametric curve indicates that rendering thread 110 should stop movement of the element, rendering thread 110 stops movement of the element. The movement may be stopped for a certain time period as defined in the parametric curve. Then, at 608, rendering thread 110 starts movement of the element again. For example, the parametric curve may move the element's positioning after a certain time period.

At 610, user interface thread 108 may receive a user input to stop movement of the element. For example, the user may stop the scrolling or may move the element in a different direction. At 612, user interface thread 108 sends a top movement command to rendering thread 110. At 614, rendering thread 110 stops the movement of the element.

Conclusion

Accordingly, rendering thread 110 can perform movement of the element without having to communicate with user interface thread 108. This provides a smoother rendering of the element when different parameters are applied to the movement. For example, when the parameters are applied to the parametric curve to provide a sticky positioning function, rendering thread 110 does not need to communicate with user interface thread 108 to determine when to perform the sticky positioning function to stop movement of the element at a sticky position. Rather, rendering thread 110 can automatically stop the movement of the element at the sticky position. The use of the parametric curve also allows rendering thread 110 to precisely stop the element at the sticky position without any overshooting. Further, the parametric curve may define movements other than the sticky positioning function.

Example Computer System

Figure 7:
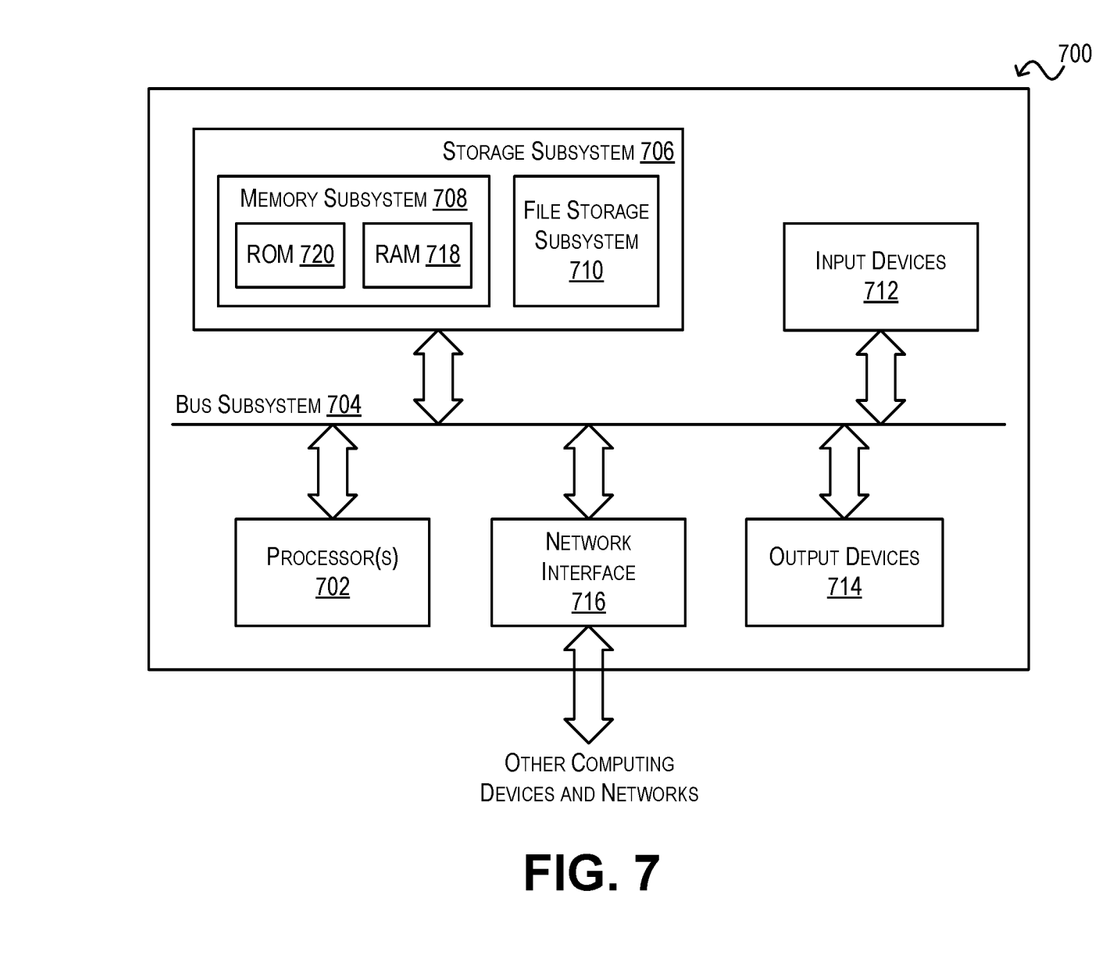
FIG. 7 depicts a simplified block diagram of an example computer system according to certain embodiments.

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage medium having stored thereon program code that, when executed by the processor, causes the processor to:
   receive, at a first thread, a start movement command and a parametric curve from a second thread in response to the second thread receiving an input to move an element that is rendered in an interface, wherein the second thread calculated the parametric curve based on the input and the parametric curve defines parameters for movement of the element;
   calculate, by the first thread, a positioning of the element on the interface using the parametric curve;
   position, by the first thread, the element in the interface based on the positioning; and
   continue, by the first thread, to calculate the positioning and position the element in the interface using the parametric curve until a stop movement command is received from the second thread.

2. The computer system of claim 1, wherein the parametric curve defines movement of the element over time.

3. The computer system of claim 1, wherein the element is moved in the interface for a first portion of the parametric curve over a first time period.

4. The computer system of claim 3, wherein movement of the element is stopped in the interface for a second portion of the parametric curve over a second time period.

5. The computer system of claim 4, wherein movement of the element is restarted in the interface after stopping of the movement for a third portion of the parametric curve over a third time period.

6. The computer system of claim 1, wherein the program code further causes the processor to:
   stop, by the first thread, movement of the element upon receiving the stop movement command from the second thread, the stop movement command being based on the second thread receiving an input to stop movement of the element.

7. The computer system of claim 1, wherein the first thread continues to position the element using the parametric curve until the stop movement command is received without querying the second thread regarding performing a function with the element.

8. The computer system of claim 7, wherein the function is a sticky positioning function that stops movement of the element for a time period defined by the parametric curve.

9. The computer system of claim 1, wherein the parametric curve stops movement of the element when the parametric curve equals a first value.

10. The computer system of claim 9, wherein the parametric curve restarts movement of the element when the parametric curve equals a second value.

11. The computer system of claim 10, wherein the movement from the input is ongoing while the element has stopped movement between the first value of the parametric curve and the second value of the parametric curve.

12. The computer system of claim 1, wherein:
   the first thread is associated with a first computer processing unit, and
   the second thread is associated with a second computer processing unit.

13. The computer system of claim 1, wherein the parametric curve defines movement of the element based on parameters applied to the parametric curve.

14. The computer system of claim 1, wherein the movement from the input is ongoing between the start movement command and the stop movement command.

15. A method comprising:
   receiving, at a first thread of a computing device, a start movement command and a parametric curve from a second thread in response to the second thread receiving an input to move an element that is rendered in an interface, wherein the second thread calculated the parametric curve based on the input and the parametric curve defines parameters for movement of the element;
   calculating, by the first thread, a positioning of the element on the interface using the parametric curve;
   positioning, by the first thread, the element in the interface based on the positioning; and
   continuing, by the first thread, to calculate the positioning and position the element in the interface using the parametric curve until a stop movement command is received from the second thread.

16. The method of claim 15, further comprising:
   stopping, by the first thread, movement of the element upon receiving the stop movement command from the second thread, the stop movement command being based on the second thread receiving an input to stop movement of the element.

17. The method of claim 15, wherein the first thread continues to position the element using the parametric curve until the stop movement command is received without querying the second thread regarding performing a function with the element.

18. The method of claim 15, wherein the function is a sticky positioning function that stops movement of the element for a time period defined by the parametric curve.

19. The method of claim 15, wherein the movement from the input is ongoing between the start movement command and the stop movement command.

20. A non-transitory computer readable storage medium having stored thereon program code executable by a computer system, the program code causing the computer system to:
   receive, at a first thread, a start movement command and a parametric curve from a second thread in response to the second thread receiving an input to move an element that is rendered in an interface, wherein the second thread calculated the parametric curve based on the input and the parametric curve defines parameters for movement of the element;
   calculate, by the first thread, a positioning of the element on the interface using the parametric curve;
   position, by the first thread, the element in the interface based on the positioning; and continue, by the first thread, to calculate the positioning and position the element in the interface using the parametric curve until a stop movement command is received from the second thread.

* * * * *